April 1, 1941.  J. TOOLAN  2,237,124

DEFROSTER FOR WINDSHIELDS OF MOTOR VEHICLES

Filed July 12, 1939  2 Sheets-Sheet 1

INVENTOR
John Toolan
BY
ATTORNEY

April 1, 1941.  J. TOOLAN  2,237,124
DEFROSTER FOR WINDSHIELDS OF MOTOR VEHICLES
Filed July 12, 1939  2 Sheets-Sheet 2

INVENTOR
John Toolan
BY
ATTORNEY

Patented Apr. 1, 1941

2,237,124

UNITED STATES PATENT OFFICE 2,237,124

DEFROSTER FOR WINDSHIELDS OF MOTOR VEHICLES

John Toolan, New York, N. Y.

Application July 12, 1939, Serial No. 283,951

3 Claims. (Cl. 20—40.5)

This invention relates to new and useful improvements in a defroster for windshields.

The invention has for an object the construction of a defroster which is characterized by the fact that there is an arrangement for directing warm air against the front of the windshield, and simultaneously against the back.

More specifically, the invention proposes the provision of a conduit extending from the vicinity of the engine of a vehicle to convey the heated air to the front of the windshield.

A further object of the invention is to provide a pipe arranged in proximity to a warm part of the engine, such as the exhaust manifold, and to direct this pipe to the inner face of the windshield and to provide a means for forcing air through the pipe.

Still further the invention proposes a control by which the passage of air through the pipe may be regulated and by which the passage of air through the conduit may be controlled.

Still further the invention proposes a shutter for the conduit arranged in a manner to assist in controlling and directing the heated air against the windshield.

Still further this invention proposes a novel arrangement for controlling the discharge of heated air against different portions of the windshield.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 8 is a fragmentary side elevational view showing a modified form of the device.

Figure 1:
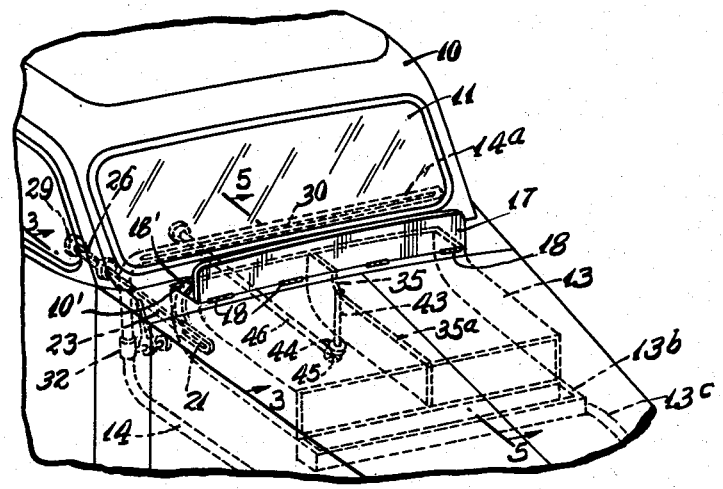
Fig. 1 is a fragmentary perspective view of a portion of a vehicle with a windshield and defroster constructed according to this invention, applied.
Figure 2:
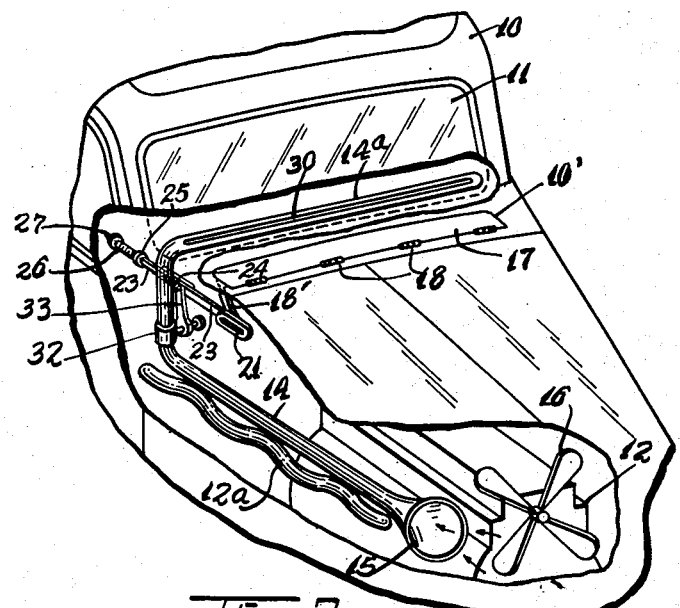
Fig. 2 is a perspective view of another portion of the vehicle to show the mechanism for defrosting the inner side of the windshield.
Figure 3:
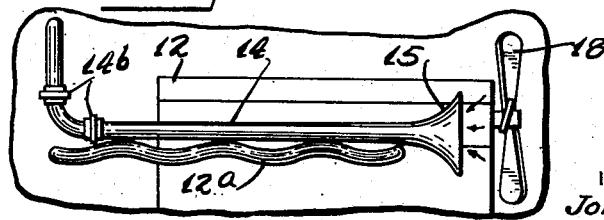
Fig. 3 is a fragmentary sectional view taken on the line 3—3 of Fig. 1.
Figure 5:
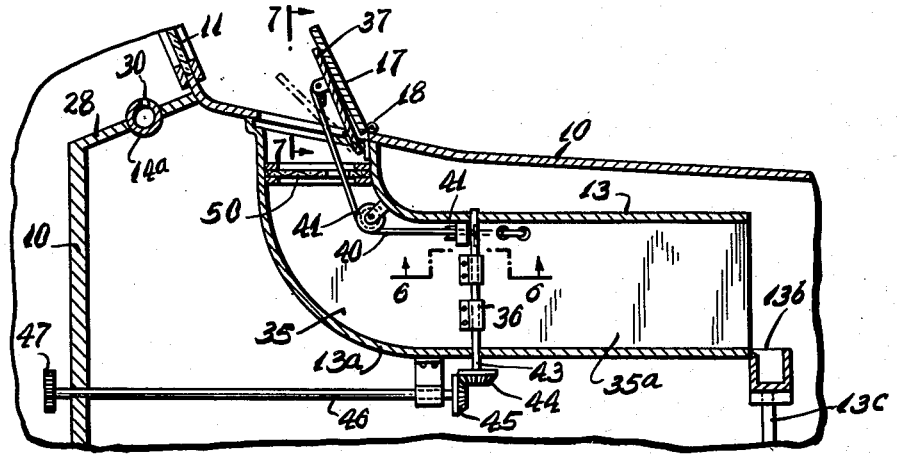
Fig. 5 is another fragmentary sectional view taken on the line 5—5 of Fig. 1.
Figure 6:
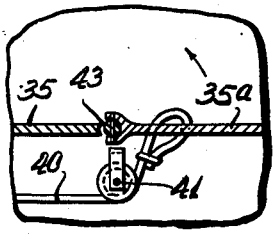
Fig. 6 is a fragmentary sectional view taken on the line 6—6 of Fig. 5.
Figure 7:
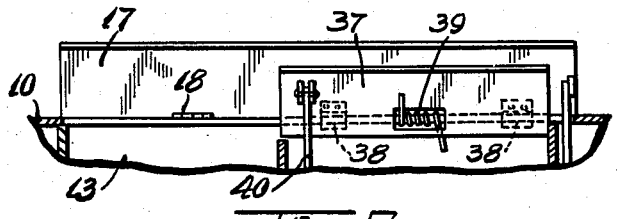
Fig. 7 is a fragmentary sectional view looking in the direction of the line 7—7 of Fig. 5.
Figure 3:
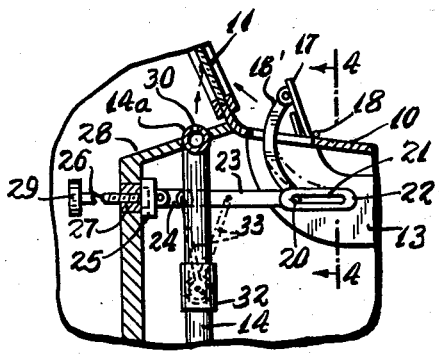
Figure 4:
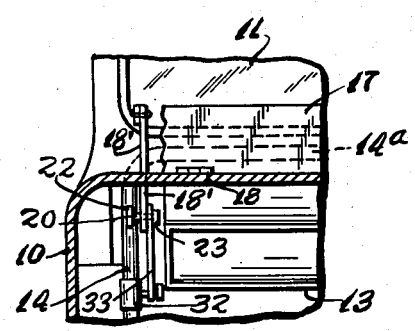
Fig. 4 is a fragmentary sectional view taken on the line 4—4 of Fig. 3.

The defroster, according to this invention, is used in combination with a vehicle 10 having a windshield 11 and an internal combustion engine 12 to the front of the windshield. A conduit 13 extends from the vicinity of the engine 12 to the front face of the windshield 11 to convey warm air from the engine to the windshield. A pipe 14 is arranged in intimate proximity with the warm part of the engine 12, such as the exhaust manifold 12ª, and extends to the inner side of the windshield to discharge warm air against same. A means is provided for forcing the air through the pipe 14 and includes a funnel 15 arranged on the outer end of the pipe and a fan 16 to blow air into the funnel. This fan preferably should be driven by the engine 12.

The conduit 13 is arranged beneath the cowl of the vehicle. It has a bottom wall 13ª arranged sloping so that rain, snow or water which may enter through the open end of the conduit will be discharged into a trough 13ᵇ and out from an exhaust pipe 13ᶜ and not directly upon the motor 12. The conduit 13 is substantially as wide as the cowl and extends out through the top of the cowl at the area 10' so as to discharge warm air towards the windshield 11.

A shutter 17 is supported by several hinges 18 upon the discharge end of the conduit. This shutter may be directed upwards at various inclinations to assist in directing a stream of hot air against the windshield. The shutter 17 is held by an arm 18' which extends downwards and pivotally connects with a slide member 20 working in a slot 21 of a horizontal bracket 22 which is fixedly mounted within the cowl.

The sliding member 20 is also pivotally connected with a link 23, in turn pivotally connected with a link 24, which in turn is connected with a block 25. This block rotatively supports one end of a threaded stem 26. This stem threadedly engages through a bushing 27 in the dash board 28 of the vehicle. The outer end of the stem 26 is provided with a handle 29 by which it may be conveniently turned. The arrangement is such that by turning the handle 29 it is possible to move the slide member 20 and so pivot the shutter 17 to various open or partially closed, or the closed position.

The pipe 14 terminates in a pipe section 14ª extended along the bottom of the windshield in the inner side thereof. This pipe section 14ª is provided with a slot opening 30 through which the heated air may discharge. This slot 30 is directed to discharge the air against the windshield. A valve 32 is arranged in the pipe 14 to control passage of the air. This valve is controlled by a radial arm 33 which is pivotally connected at its outer end to one end of the link 23. The arrangement is such that when the handle 29 is operated it simultaneously controls the valve 32 and the shutter 17. Both of these are opened or closed together. Conduit device 13 may also be installed independently from the funnel pipe arrangement 14, or vice versa.

The rear of the conduit 13 is provided with a stationary partition 35 dividing it in two, so that there are separate discharges of air for the driver's section of the windshield 11, and for the adjacent passenger's section of the windshield. This partition 35 has a front section 35ᵃ extending through the front portion of the conduit 13. This front section 35ᵃ is hingedly mounted, by a hinge 36 upon the front edge of the rear section. This front hinged section 35ᵃ is adapted to move laterally, to various positions across one-half of the conduit 13 preferably the half in front of the passenger's portion of the windshield so as to partially close this one-half of the conduit, and cause varying amounts of air entering the front of the conduit to pass through the other half.

An auxiliary shutter 37 is arranged towards the inner face of the shutter 17 and extends across one-half of the discharge opening 10' of the conduit 13, specifically the half representing the seat of a passenger next to the driver of the automobile. This auxiliary shutter 37 is supported by several hinges 38, at its bottom end, which are connected with the top of the conduit 13, so as to be properly supported. A resilient means, such as the spring 39, is arranged to normally urge the shutter 37 resiliently against the shutter 17. This spring 39 is coaxial upon the hinge of the auxiliary shutter 37, and acts between the shutter 37 and the material of the conduit 13.

A cable 40 is connected with an upper portion of the auxiliary shutter 37, and is guided over suitably guiding rollers 41, and connects with the movable partition section 35ᵃ in a manner so that when the partition 35ᵃ is moved laterally to close one-half of the conduit 13, the shutter 37 will be moved closed, in specific relationship to the position of the moved section 35ᵃ. For example, if the section 35ᵃ is moved to a three-quarter position, the auxiliary shutter 37 will move closed to a three-quarters position.

In the partially open position of the front section 35ᵃ of the partition a small quantity of heated air will enter the conduit 13 and discharge against the windshield in front of the passenger's seat. If it were not for the auxiliary shutter 37 the small quantity of air entering the passenger's partially opened portion of the conduit would lose its velocity as it discharged from the entirely opened rear end of this half of the conduit 13. However, the auxiliary shutter 37 is provided and mimics the movements of the front section 35ᵃ to cause the small quantity of air to discharge against the passenger's half of the windshield at the same velocity at which it entered the front end of the conduit.

The partition section 35ᵃ is adapted to be manually adjusted. This is accomplished by a shaft 43 which is connected with the rear edge of the shutter section 35ᵃ and is rotatively supported, and provided with a bevel gear 44 that meshes with a bevel gear 45 on a shaft 46 rotatively supported on a portion of the automobile body 10, particularly the dashboard thereof. This shaft 46 is provided with a knob by which the shaft may be turned.

A screen 50 is mounted across the discharge end of the conduit 13 for screening the discharge air.

The operation of the device is as follows:

The heated air from under the hood of the automobile will enter the funnel 15 and pass through the pipe 14 and discharge through the slot 30 against the inside face of windshield 11.

Heated air from under the hood will also enter the front end of the conduit 13, and in a normal position of the partition 35ᵃ will discharge from the entire width of the rear end of the conduit and strike the shutters 37 and 17, and be deflected against the windshield. However in very stormy weather when snow or sleet start accumulating on the outside of the windshield 11, an adjustment may be made to at least keep the driver's half of the windshield clear by supplying additional warm air to that section. This is done by turning the knob 47, to turn the partition section 35ᵃ across half of the conduit 13, the half opposite the driver. This partition 35ᵃ will therefore deflect most of the heated air through the half of the conduit representing the driver's half, then to the windshield. Simultaneously as partition 35ᵃ is moved, to a closed position, the auxiliary shutter 37ᵃ will similarly be moved because of the interconnection, by the cable 40.

The handle 29 may be operated to control the shutter 17 and to control the valve 32 which is interposed in the pipe 14.

In Fig. 8, the pipe 14 is illustrated with suitable fittings 14ᵇ which permits ready installation of the device into already built cars.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a defroster for windshields, a conduit for location beneath the cowl of a vehicle having an engine beneath the cowl to receive heated air from the engine of said vehicle and having a discharge end opening in the top of the cowl, a shutter for deflecting discharged air from said opening against said windshield, means for moving and holding said shutter in various deflecting positions, a longitudinal partition dividing said conduit in two and having a front section hingedly mounted to move laterally to various positions across one part of said conduit to deflect various amounts of air into the other part of said conduit, an auxiliary shutter for the rear half of the portion of said conduit being closed by the front section of said partition, resilient means urging said auxiliary shutter against said shutter, and a cable connected with the front section of said partition and with said auxiliary shutter for drawing the auxiliary shutter closed to various degrees in proportion as the front section of the partition is moved laterally across said conduit.

2. In a defroster for windshields, a conduit for location beneath the cowl of a vehicle having an engine beneath the cowl to receive heated air from the engine of said vehicle and having a discharge end opening in the top of the cowl, a shutter for deflecting discharged air from said opening against said windshield, means for moving and holding said shutter in various deflecting positions, a longitudinal partition dividing said conduit in two and having a front section hingedly mounted to move laterally to various positions across one part of said conduit to deflect various amounts of air into the other part of said conduit, an auxiliary shutter for the rear half of the portion of said conduit being closed by the front section of said partition, resilient means urging said auxiliary shutter against said shutter, and a cable connected with the front section of said partition and with said auxiliary shutter for drawing the auxiliary shutter closed to various degrees in proportion as the front section of the partition is moved laterally across said conduit, said resilient means comprising a spring acting between said auxiliary shutter and said conduit, said auxiliary shutter being pivotally mounted at its lower edge, and extending adjacent to and acting against the rear face of said shutter.

3. In a defroster for windshields, a conduit for location beneath the cowl of a vehicle having an engine beneath the cowl to receive heated air from the engine of said vehicle and having a discharge end opening in the top of the cowl, a shutter for deflecting discharged air from said opening against said windshield, means for moving and holding said shutter in various deflecting positions, a longitudinal partition dividing said conduit in two and having a front section hingedly mounted to move laterally to various positions across one part of said conduit to deflect various amounts of air into the other part of said conduit, an auxiliary shutter for the rear half of the portion of said conduit being closed by the front section of said partition, resilient means urging said auxiliary shutter against said shutter, and a cable connected with the front section of said partition and with said auxiliary shutter for drawing the auxiliary shutter closed to various degrees in proportion as the front section of the partition is moved laterally across said conduit, said resilient means comprising a spring acting between said auxiliary shutter and said conduit, and means for moving and holding the front section of said partition comprising a shaft connected with a hinge for said front section, a gear mounted on the bottom end of said shaft, and a transmission system including a gear meshing with said gear for manually turning said shaft.

JOHN TOOLAN.